US012230928B2

(12) United States Patent
Wang et al.

(10) Patent No.: US 12,230,928 B2
(45) Date of Patent: Feb. 18, 2025

(54) ELECTRICAL RECEPTACLE CONNECTOR

(71) Applicant: ADVANCED-CONNECTEK INC., New Taipei (TW)

(72) Inventors: Shu-Fen Wang, New Taipei (TW); Yu-Chai Yeh, New Taipei (TW); Guan-Lin Chen, New Taipei (TW)

(73) Assignee: ADVANCED-CONNECTEK INC., New Taipei (TW)

( * ) Notice: Subject to any disclaimer, the term of this patent is extended or adjusted under 35 U.S.C. 154(b) by 380 days.

(21) Appl. No.: 17/889,994

(22) Filed: Aug. 17, 2022

(65) Prior Publication Data

US 2023/0053625 A1 Feb. 23, 2023

(30) Foreign Application Priority Data

Aug. 18, 2021 (TW) ................................ 110209785

(51) Int. Cl.

| | |
|---|---|
| ***H01R 24/00*** | (2011.01) |
| ***H01R 13/516*** | (2006.01) |
| ***H01R 13/6471*** | (2011.01) |
| ***H01R 24/60*** | (2011.01) |
| ***H01R 43/16*** | (2006.01) |
| *H01R 107/00* | (2006.01) |

(52) U.S. Cl.

CPC ........... *H01R 24/60* (2013.01); *H01R 13/516* (2013.01); *H01R 13/6471* (2013.01); *H01R 43/16* (2013.01); *H01R 2107/00* (2013.01)

(58) Field of Classification Search

CPC .. H01R 24/60; H01R 13/516; H01R 13/6471; H01R 43/16; H01R 2107/00

USPC .......................................................... 439/660

See application file for complete search history.

(56) References Cited

U.S. PATENT DOCUMENTS

| | | | | |
|---|---|---|---|---|
| 9,614,310 | B2 * | 4/2017 | Tsai | H01R 13/6471 |
| 9,634,409 | B2 * | 4/2017 | Tsai | H01R 43/0256 |
| 9,673,552 | B2 * | 6/2017 | Tsai | H01R 13/405 |
| 9,685,739 | B2 * | 6/2017 | Chen | H01R 13/08 |
| 9,728,900 | B1 * | 8/2017 | Tsai | H01R 24/60 |
| 9,728,916 | B1 * | 8/2017 | Tsai | H01R 13/516 |
| 9,812,818 | B2 * | 11/2017 | Tsai | H01R 13/6596 |
| 9,837,772 | B2 * | 12/2017 | Tsai | H01R 13/502 |
| 9,847,595 | B2 * | 12/2017 | Tsai | H01R 13/6581 |
| 9,935,401 | B2 * | 4/2018 | Tsai | H01R 13/6586 |
| 9,960,552 | B2 * | 5/2018 | Tsai | H01R 24/64 |
| 9,991,652 | B2 * | 6/2018 | Tsai | H01R 13/6594 |
| 10,079,456 | B2 * | 9/2018 | Chen | H01R 13/6585 |

(Continued)

*Primary Examiner* — Abdullah A Riyami
*Assistant Examiner* — Vladimir Imas
(74) *Attorney, Agent, or Firm* — MUNCY, GEISSLER, OLDS & LOWE, P.C.

(57) ABSTRACT

An electrical receptacle connector includes a metallic shell, an insulated housing in the metallic shell, a plurality of terminals at the insulated housing, and a metallic plate. The terminals are arranged in two rows, and the metallic plate is at the insulated housing and between the terminals in the two rows. The metallic plate includes a through hole at a front portion of the tongue portion. The through hole has several through portions and a communication portion between the through portions. By allowing that the communication portion to be in communication with the through portions to form a through hole in an elongated shape, the molding efficiency for forming the tongue portion with the filling of the plastic materials can be increased.

20 Claims, 7 Drawing Sheets

(56) References Cited

U.S. PATENT DOCUMENTS

| | | | | |
|---|---|---|---|---|
| 10,128,596 | B2 * | 11/2018 | Tsai | H01R 12/724 |
| 10,522,924 | B2 * | 12/2019 | Huang | H01R 12/724 |
| 10,714,875 | B2 * | 7/2020 | Wan | H01R 13/6582 |
| 10,749,299 | B2 * | 8/2020 | Tada | H01R 13/6467 |
| 10,879,637 | B2 * | 12/2020 | Chung | H01R 13/631 |
| 11,211,746 | B2 * | 12/2021 | Jung | H01R 13/629 |
| 2023/0057194 | A1 * | 2/2023 | Wang | H01R 13/6585 |
| 2023/0058301 | A1 * | 2/2023 | Wang | H01R 13/6596 |
| 2024/0305027 | A1 * | 9/2024 | Xiao | H01R 13/6582 |

* cited by examiner

ELECTRICAL RECEPTACLE CONNECTOR

CROSS-REFERENCE TO RELATED APPLICATION

This non-provisional application claims priority under 35 U.S.C. § 119(a) to patent application Ser. No. 11/020,9785 in Taiwan, R.O.C. filed on Aug. 18, 2021, the entire contents of which are hereby incorporated by reference.

FIELD OF THE INVENTION

The instant disclosure relates to an electrical connector, and more particular to an electrical receptacle connector.

BACKGROUND

Generally, Universal Serial Bus (USB) is a serial bus standard to the PC architecture with a focus on computer interface, consumer and productivity applications. The existing Universal Serial Bus (USB) interconnects have the attributes of plug-and-play and ease of use by end users. Now, as technology innovation marches forward, new kinds of devices, media formats and large inexpensive storage are converging. They require significantly more bus bandwidth to maintain the interactive experience that users have come to expect. In addition, the demand of a higher performance between the PC and the sophisticated peripheral is increasing. The transmission rate of USB 2.0 is insufficient. As a consequence, faster serial bus interfaces such as USB 3.0, are developed, which may provide a higher transmission rate so as to satisfy the need of a variety devices.

SUMMARY OF THE INVENTION

The appearance, the structure, the contact ways of terminals, the number of terminals, the pitches between terminals (the distances between the terminals), and the pin assignment of terminals of a USB type-C electrical connector known to the inventor(s) are totally different from those of a USB electrical connector known to the inventor(s). When a user slantly inserts an electrical plug connector known to the inventor into an electrical receptacle connector known to the inventor, the tongue portion inside the electrical receptacle connector will be pushed by the components of the electrical plug connector and thus being damaged or broken easily.

In view of this, according to one or some embodiments, an electrical receptacle connector is provided. The electrical receptacle connector comprises a metallic shell, an insulated housing, a plurality of terminals, and a metallic plate. The metallic comprises a receiving cavity. The insulated housing is in the receiving cavity. The insulated housing comprises a base portion and a tongue portion extending outwardly from one side of the base portion. The tongue portion has two faces, a front side surface, and two side surfaces. The front side surface is connected to front side portions of the two faces, and the two side surfaces are connected to two sides of the two faces. The terminals are arranged in two rows and at the insulated housing. The terminals comprise a plurality of contact portions at the two faces of the tongue portion. The terminals comprise a plurality of high-speed signal terminals, a plurality of low-speed signal terminals, a plurality of power terminals, and a plurality of ground terminals. The ground terminals are at two outermost sides of the power terminals. The low-speed signal terminals are between the power terminals. In at least one of the two rows of the terminals, each of the high-speed signal terminals is between an adjacent one of the power terminals and an adjacent one of the ground terminals. The metallic plate is at the tongue portion and between the terminals in the two rows. Each of two sides of the metallic plate has a protrusion, and a side portion of each of the protrusions is exposed from a corresponding one of the two side surfaces of the tongue portion. The metallic plate has a through hole. The through hole has a plurality of through portions and a communication portion. The through portions are at the protrusions and correspond to front ends of the contact portions of the high-speed signal terminals. Each of two sides of the communication portion is in communication with a corresponding one of the through portions, and the communication portion corresponds to front ends of the contact portions of the low-speed signal terminals.

In some embodiments, in the two rows of the terminals, the front ends of the contact portions of the high-speed signal terminals and the front ends of the contact portions of the low-speed signal terminals are shielded by the metallic plate.

In some embodiments, the communication portion has an inner diameter, the metallic plate has a protruding section, and the protruding section extends toward the front side surface of the tongue portion to increase the inner diameter of the communication portion.

In some embodiments, an end surface of the protruding section is nearer to the front side surface of the tongue portion, as compared to end surfaces of the contact portions of the power terminals. In other words, in this embodiment a distance between the end surface of the protruding section and the front side surface of the tongue portion is less than a distance between the end surfaces of the contact portions of the power terminals and the front side surface of the tongue portion.

In some embodiments, an end surface of the protruding section and end surfaces of the contact portions of the power terminals are flushed with each other at a horizontal plane.

In some embodiments, the contact portions of the ground terminals in the two rows correspond to the through portions, and the contact portions of the power terminals in the two rows face each other.

In some embodiments, the through hole has several bent portions between the through portions and the communication portion, and the bent portions are bent toward the base portion.

In some embodiments, the metallic plate has a plurality of recessed portions. The recessed portions are at inner sides of the through hole and correspond to the bent portions. An inner side of each of the recessed portions has a slot. A width of the slot gradually increases from a middle portion of the slot toward two ends of the slot. The two ends of each of the slots are in communication with a corresponding one of the through portions and the communication portion.

In some embodiments, a front end of each of the protrusions is exposed from the front side surface of the tongue portion.

In some embodiments, each of the two sides of the metallic plate has a connection portion, and the connection portions are at the base portion.

In some embodiments an electrical receptacle connector is provided. The electrical receptacle connector comprises a metallic shell, an insulated housing, a plurality of terminals, and a metallic plate. The metallic shell comprises a receiving cavity. The insulated housing is in the receiving cavity. The insulated housing comprises a base portion and a tongue portion extending outwardly from one side of the base portion. The tongue portion has two faces, a front side surface, and two side surfaces. The front side surface is connected to front side portions of the two faces, and the two side surfaces are connected to two sides of the two faces. The terminals are arranged in two rows and at the insulated housing. The metallic plate is at the tongue portion and between the terminals in the two rows. The metallic plate has a large cutout at a front edge thereof. Each of two sides of the metallic plate has a protrusion, and a side portion of each of the protrusions is exposed from a corresponding one of the two side surfaces of the tongue portion. The metallic plate has a through hole, and the through hole has a plurality of through portions and a communication portion. The through portions are at the protrusions and each of the through portions is between the large cutout and a corresponding side of the metallic plate. Each of two sides of the communication portion is in communication with a corresponding one of the through portions.

In some embodiments, the terminals comprise a plurality of contact portions, and the contact portions are at the two faces of the tongue portion. The terminals comprise a plurality of high-speed signal terminals, a plurality of low-speed signal terminals, a plurality of power terminals, and a plurality of ground terminals. The ground terminals are at two outermost sides of the power terminals, and the low-speed signal terminals are between the power terminals. In at least one of the two rows of the terminals, each of the high-speed signal terminals is between an adjacent one of the power terminals and an adjacent one of the ground terminals.

In some embodiments, in the two rows of the terminals, the front ends of the contact portions of the high-speed signal terminals and the front ends of the contact portions of the low-speed signal terminals are shielded by the metallic plate, the through portions corresponds to the front ends of the contact portions of the high-speed signal terminals, and the communication portion corresponds to the front ends of the contact portions of the low-speed signal terminals.

In some embodiments, the communication portion has an inner diameter, the metallic plate has a protruding section, and the protruding section extends toward the front side surface of the tongue portion to increase the inner diameter of the communication portion.

In some embodiments, a distance between an end surface of the protruding section and the front side surface of the tongue portion is less than a distance between end surfaces of the contact portions of the power terminals and the front side surface of the tongue portion.

In some embodiments, an end surface of the protruding section and end surfaces of the contact portions of the power terminals are flushed with each other at a horizontal plane.

In some embodiments, the contact portions of the ground terminals in the two rows correspond to the through portions, and the contact portions of the power terminals in the two rows face each other.

In some embodiments, the through hole has several bent portions between the through portions and the communication portion, and the bent portions are bent toward the base portion.

In some embodiments, the metallic plate has a plurality of recessed portions. The recessed portions are at inner sides of the through hole and correspond to the bent portions. An inner side of each of the recessed portions has a slot, and a width of the slot gradually increase from a middle portion of the slot toward two ends of the slot. The two ends of each of the slots are in communication with a corresponding one of the through portions and the communication portion.

In some embodiments, a front end of each of the protrusions is exposed from the front side surface of the tongue portion.

Based on the above, according to one or some embodiments of the instant disclosure, the communication portion of the metallic plate is in communication with the through portions to form an elongated through hole. When the metallic plate and the insulated housing are molded by insert-molding, plastic materials can be conveniently filled through the hollow regions of the communication portion and the through portions to form the entire tongue portion, thereby increasing the molding efficiency as well as reducing the condition that front ends of the contact portions of the terminals are not properly covered by the tongue portion (the short shot condition of the plastic materials).

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
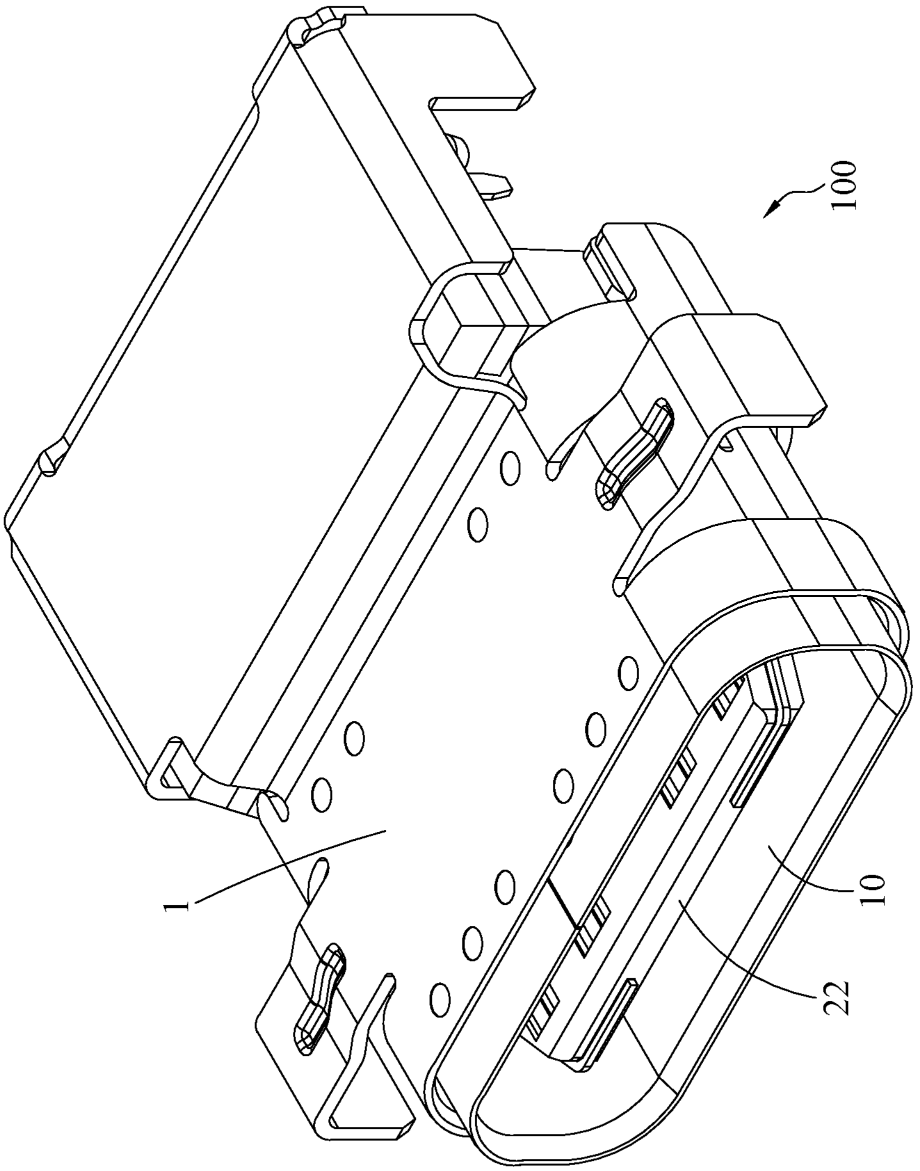
FIG. 1 illustrates a perspective view of an electrical receptacle connector according to some embodiments of the instant disclosure.
Figure 2:
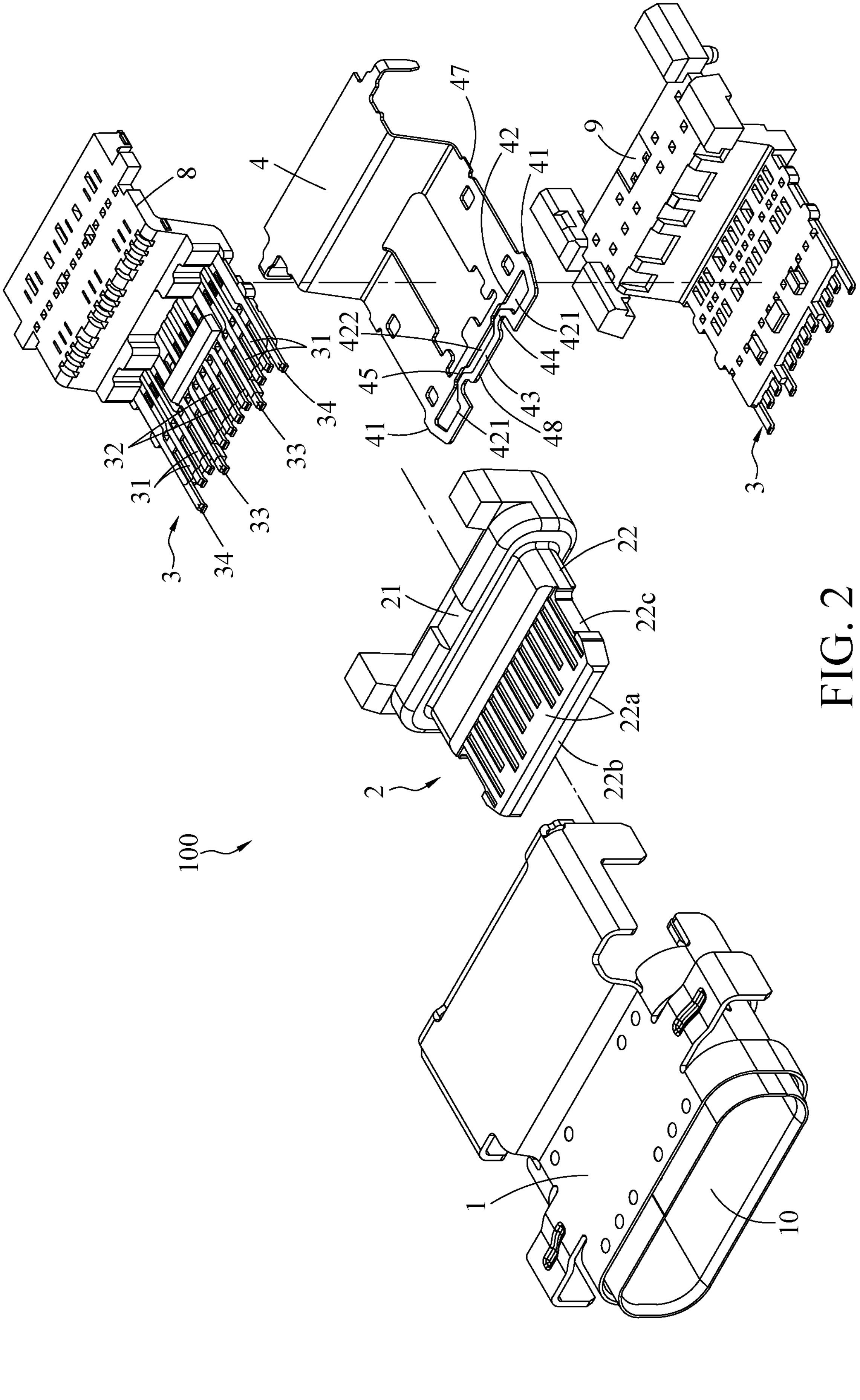
FIG. 2 illustrates an exploded view of the electrical receptacle connector according to some embodiments of the instant disclosure.

Please refer to FIG. 1 and FIG. 2. FIG. 1 illustrates a perspective view of an electrical receptacle connector 100 according to some embodiments of the instant disclosure. FIG. 2 illustrates an exploded view of the electrical receptacle connector 100 according to some embodiments of the instant disclosure. In some embodiments, the electrical receptacle connector 100 is in accordance with the specification of USB type-C connection interfaces. In this embodiment, the electrical receptacle connector 100 comprises a metallic shell 1, an insulated housing 2, a plurality of terminals 3, and a metallic plate 4.

The metallic shell 1 is a hollow shell and has a receiving cavity 10.

The insulated housing 2 is in the receiving cavity 10. The insulated housing 2 has a base portion 21 and a tongue portion 22 extending from one side of the base portion 21. The tongue portion 22 has two faces 22*a*, a front side surface 22*b*, and two side surfaces 22*c*. The front side surface 22*b* is connected to front side portions of the two faces 22*a*, and the two side surfaces 22*c* are connected to two sides of the two faces 22*a*.

Figure 3:
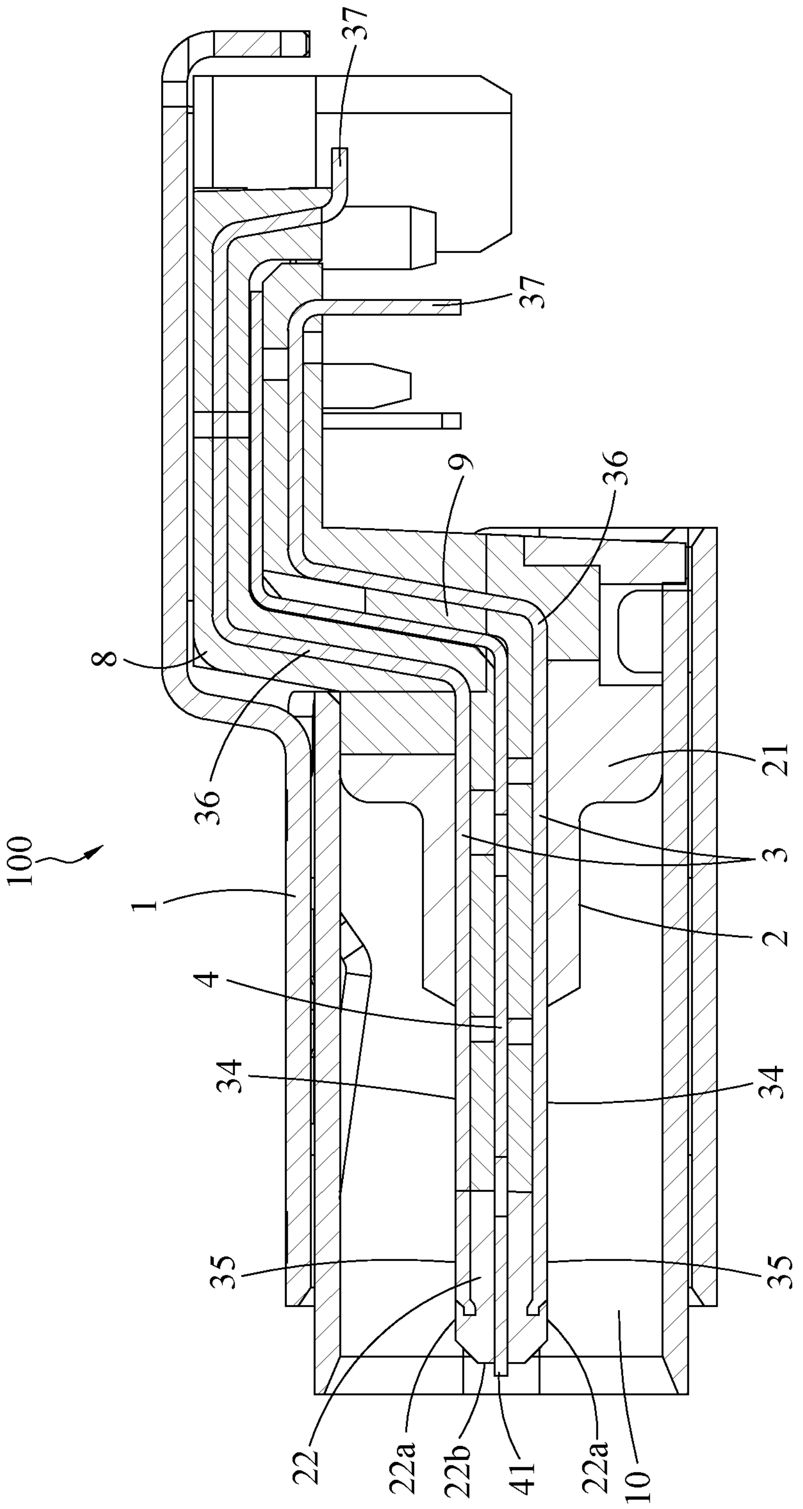
FIG. 3 illustrates a cross-sectional view of the electrical receptacle connector according to some embodiments of the instant disclosure.

The terminals 3 are arranged in two rows, and the two rows are respectively arranged on the insulated housing 2 (as shown in FIG. 3). The terminals 3 comprise a plurality of contact portions 35 at the two faces 22*a* of the tongue portion 22. The terminals 3 comprise a plurality of high-speed signal terminals 31, a plurality of low-speed signal terminals 32, a plurality of power terminals 33, and a plurality of ground terminals 34. The ground terminals 34 are at two outermost sides of the power terminals 33. The low-speed signal terminals 32 are between the power terminals 33. Each of the high-speed signal terminals 31 is between an adjacent one of the power terminals 33 and an adjacent one of the ground terminals 34.

Figure 6:
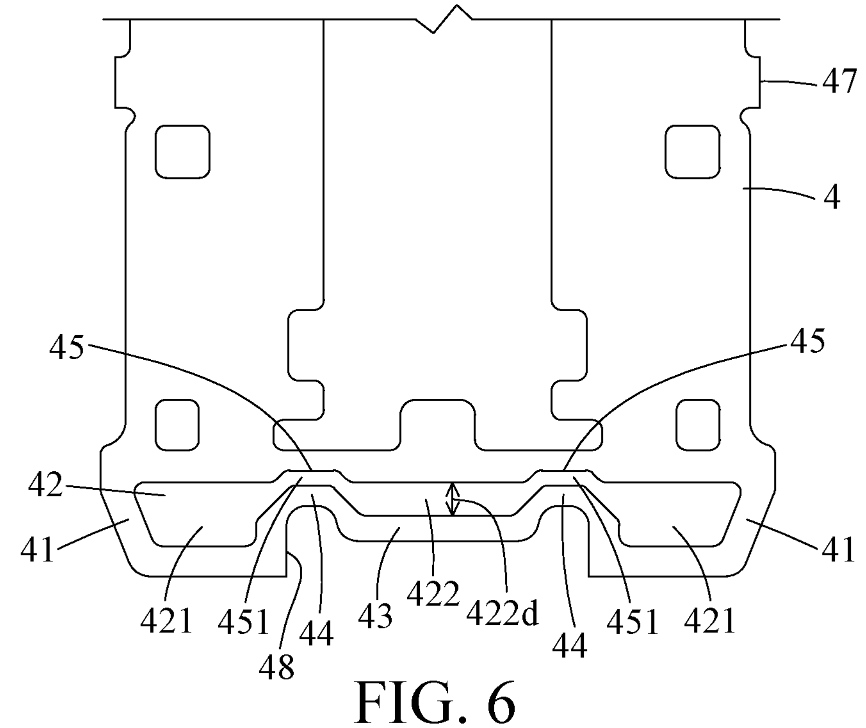
FIG. 6 illustrates a partial top view of the metallic plate of the electrical receptacle connector from the viewing angle of FIG. 5.

The metallic plate 4 is at the tongue portion 22 and between the terminals 3 in the two rows (as shown in FIG. 3). The metallic plate 4 has a large cutout 48 at a front edge thereof. Each of two sides of the metallic plate 4 has a protrusion 41, and a side portion of each of the protrusions 41 is exposed from a corresponding one of the side surfaces 22*c* of the tongue portion 22. The metallic plate 4 has a through hole 42. The through hole 42 has a plurality of through portions 421 and a communication portion 422 (as shown in FIG. 6, the through portions 421 are at the two sides of the metallic plate 4, the communication portion 422 is at the middle portion of the metallic plate 4, both the through portions 421 and the communication portion 422 are defined through the metallic plate 4). The through holes 42 are at the protrusions 41 and correspond to front ends of the contact portions 35 of the high-speed signal terminals 31. Each of two sides of the communication portion 422 is in communication with a corresponding one of the through portions 421, and the communication portion 422 corresponds to front ends of the contact portions 35 of the low-speed signal terminals 32.

In this embodiment, the communication portion 422 is in communication with the through portions 421. Therefore, when the metallic plate 4 and the insulated housing 2 are molded by insert-molding, plastic materials can be conveniently filled through the hollow regions of the communication portion 422 and the through portions 421 to form the entire tongue portion 22, thereby increasing the molding efficiency as well as reducing the condition that front ends of the contact portions 35 of the terminals 3 are not properly covered by the tongue portion 22 (the short shot condition of the plastic materials).

In some embodiments, in the case that the tongue portion 22 does not cover the front ends of the contact portions 35, the plastic materials cannot be properly filled through the hollow region of the communication portion 422 to form the tongue portion 22 (a possible scenario is that the region of the communication portion 422 is not large enough). As a result, the efficiency for filling the plastic materials for forming the tongue portion 22 is reduced, and the front ends of the contact portions 35 of the terminals 3 are not covered by the tongue portion 22 and are exposed. Consequently, upon terminals of an electrical plug connector is mated with the contact portions 35 of the electrical receptacle connector 100, the contact portions 35 are prone to be deflected upwardly to cause an improper mating between the terminals of the electrical plug connector and the terminals 3 of the electrical receptacle connector 100. Moreover, since the contact portions 35 are prone to be deflected upwardly, the contact portions 35 may be in contact with each other to cause short circuit condition.

Figure 4:
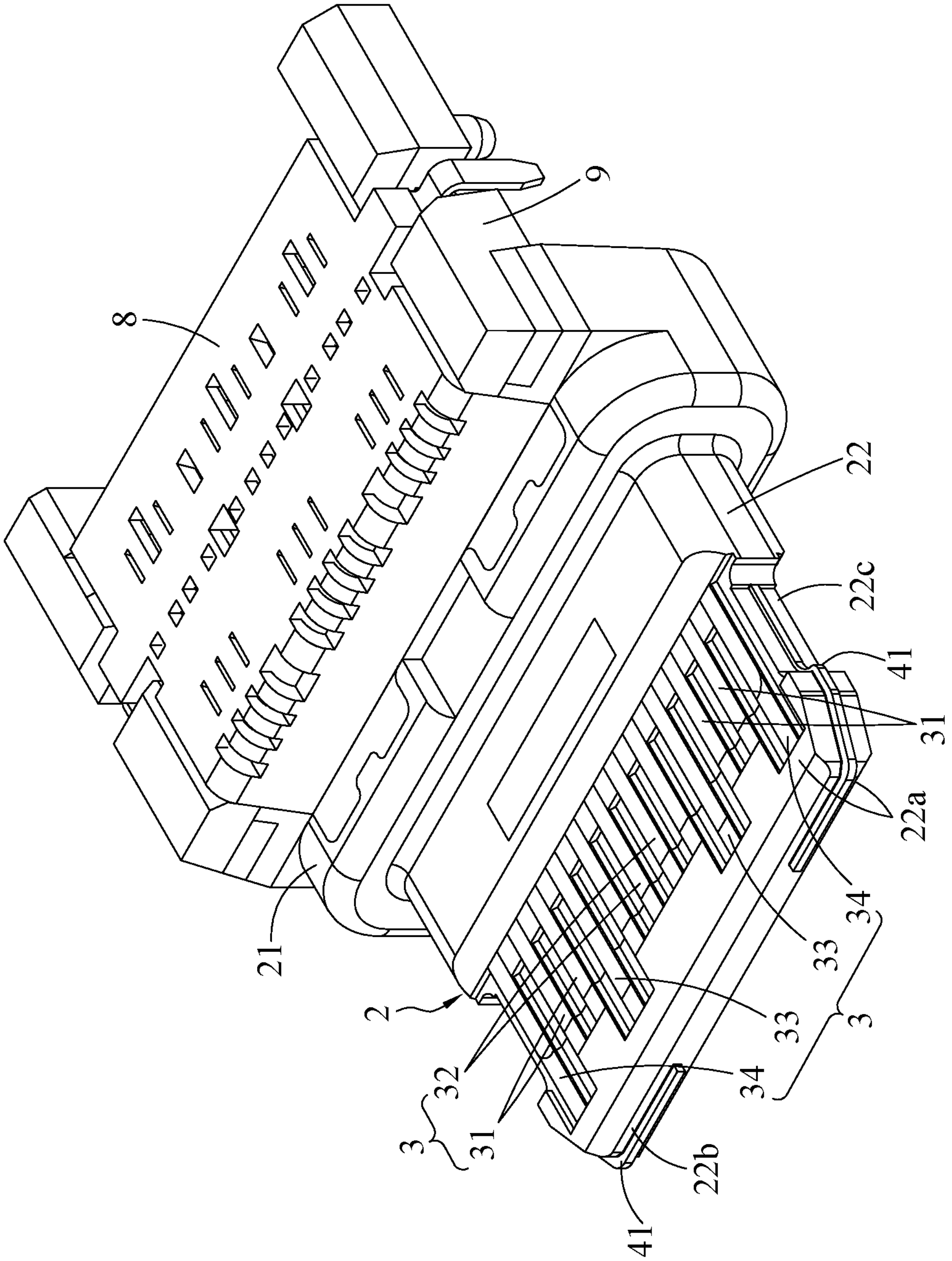
FIG. 4 illustrates a perspective view of the terminal module of the electrical receptacle connector according to some embodiments of the instant disclosure.

Please refer to FIG. 3 and FIG. 4. FIG. 3 illustrates a cross-sectional view of the electrical receptacle connector 100 according to some embodiments of the instant disclosure. FIG. 4 illustrates a perspective view of the terminal module of the electrical receptacle connector 100 according to some embodiments of the instant disclosure. In some embodiments, a front end of each of the protrusions 41 is exposed from the front side surface 22*b* of the tongue portion 22, the front ends of the protrusions 41 at the two sides of the metallic plate 4 extend toward the front side surface 22*b* of the tongue portion 22, and the front end and two sides of each of the protrusions 41 are exposed from a front end and the two sides of the tongue portion 22. Hence, the structural strength of the tongue portion 22 can be enhanced. Therefore, when an electrical plug connector is slantly inserted into the electrical receptacle connector 100, the tongue portion 22 can be supported by the protrusion 41, and the electrical plug connector in the slanting orientation can be prevented from damaging or breaking the tongue portion 22 upon the electrical plug connector hits the tongue portion 22.

Figure 5:
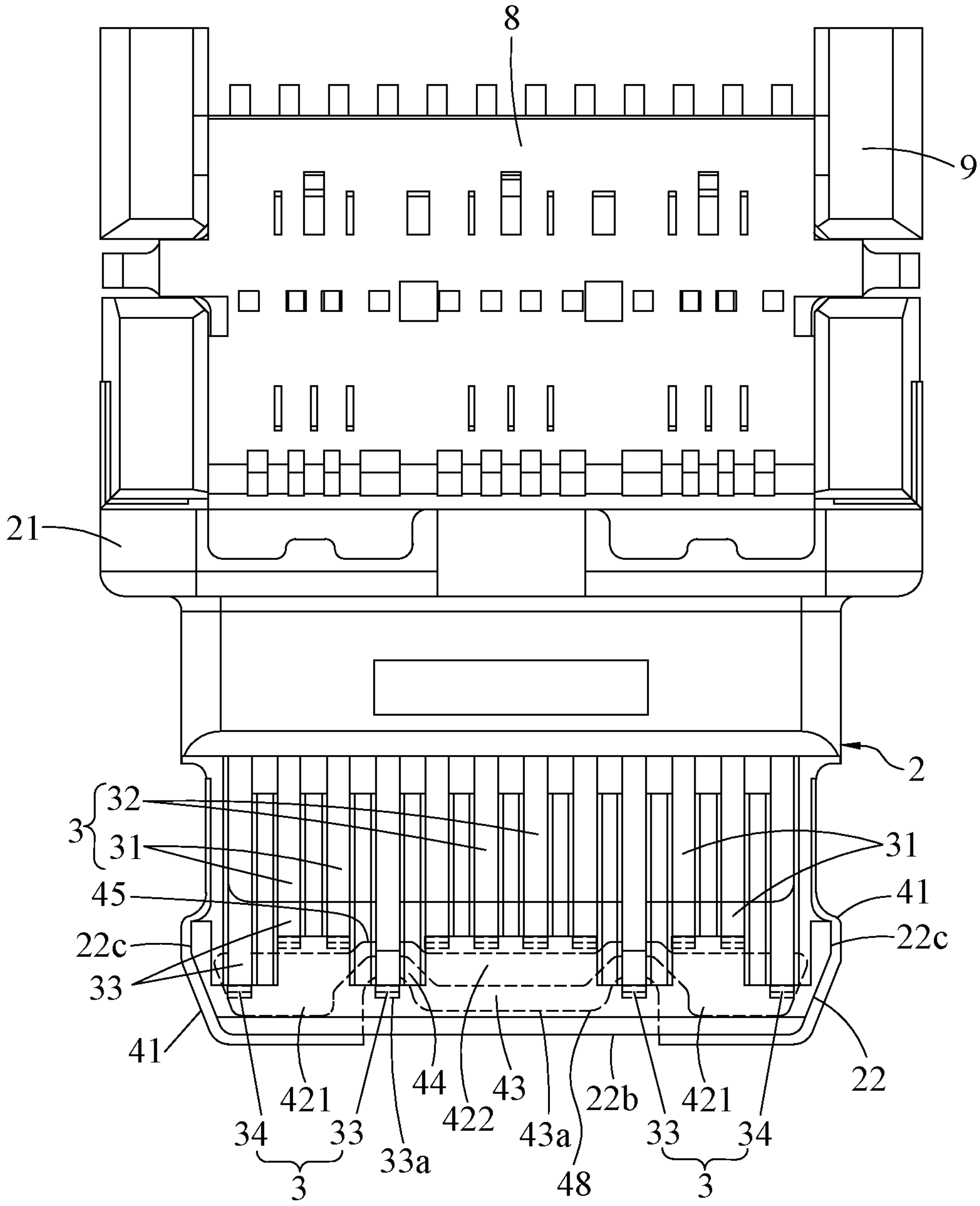
FIG. 5 illustrates a top view of the terminal module of the electrical receptacle connector according to some embodiments of the instant disclosure.

Please refer to FIG. 2 and FIG. 5. FIG. 5 illustrates a top view of the terminal module of the electrical receptacle connector 100 according to some embodiments of the instant disclosure. In this embodiment, in the two rows of the terminals 3, the front ends of the contact portions 35 of the high-speed signal terminals 31 and the front ends of the contact portions 35 of the low-speed signal terminals 32 are shielded by the metallic plate 4. The front ends of the contact portions 35 of the high-speed signal terminals 31 and the front ends of the contact portions 35 of the low-speed signal terminals 32 are not exposed from the through hole 42. Therefore, the front ends of the contact portions 35 of the high-speed signal terminals 31 do not face each other and the front ends of the contact portions 35 of the low-speed signal terminals 32 do not face each other. In this embodiment, the contact portions 35 of the high-speed signal terminals 31 and the contact portions 35 of the low-speed signal terminals 32 at the upper row of the tongue portion 22 and the contact portions 35 of the high-speed signal terminals 31 and the contact portions 35 of the low-speed signal terminals 32 at the lower row of the tongue portion 22 can be shielded from each other by the metallic plate 4 to reduce the crosstalk signal interferences upon signal transmission.

Figure 7:
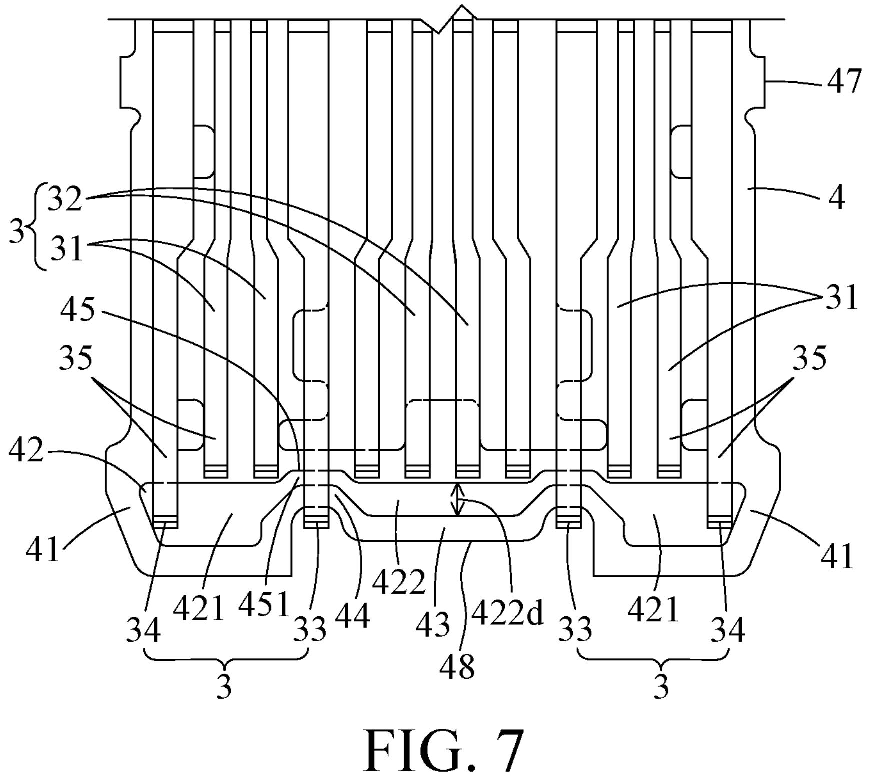
FIG. 7 illustrates a partial top view of the terminals and the metallic plate of the electrical receptacle connector from the viewing angle of FIG. 5, where the protruding section of the metallic plate protrudes from the front ends of the contact portions of the power terminals.

Please refer to FIG. 6 and FIG. 7. FIG. 6 illustrates a partial top view of the metallic plate 4 of the electrical receptacle connector 100. FIG. 7 illustrates a partial top view of the terminals 3 and the metallic plate 4 of the electrical receptacle connector 100, where the protruding section 43 of the metallic plate 4 protrudes from the front ends of the contact portions 35 of the power terminals 33. In some embodiments, the communication portion 422 has an inner diameter 422*d*, the metallic plate 4 has a protruding section 43, and the protruding section 43 extends toward the front side surface 22*b* of the tongue portion 22 to increase the width of the inner diameter 422*d*. Through increasing the width of the inner diameter 422*d*, plastic materials can be conveniently filled through the hollow region of the communication portion 422 to form the entire tongue portion 22, thereby increasing the molding efficiency.

Please refer to FIG. 6 and FIG. 7. In some embodiments, an end surface 43*a* of the protruding section 43 is nearer to the front side surface 22*b* of the tongue portion 22, as compared to end surfaces 33*a* of the contact portions 35 of the power terminals 33. In other words, in this embodiment a distance between the end surface 43*a* of the protruding section 43 and the front side surface 22*b* of the tongue portion 22 is less than a distance between the end surfaces 33*a* of the contact portions 35 of the power terminals 33 and the front side surface 22*b* of the tongue portion 22.

Figure 8:
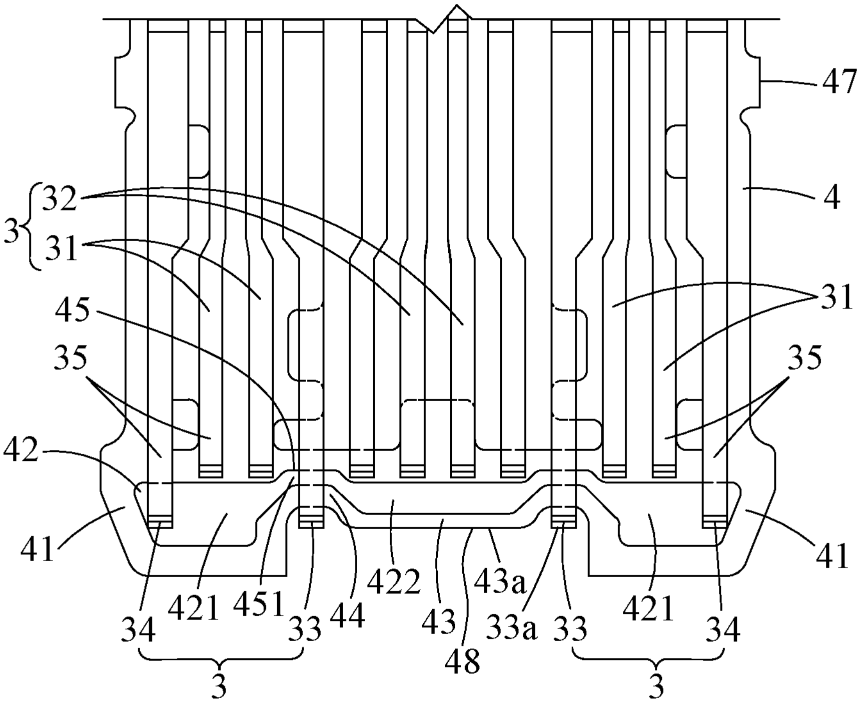
FIG. 8 illustrates a partial top view of the terminals and the metallic plate of the electrical receptacle connector from the viewing angle of FIG. 5, where the protruding section of the metallic plate and the front ends of the contact portions of the power terminals are flushed with each other.

Please refer to FIG. 8. FIG. 8 illustrates a partial top view of the terminals 3 and the metallic plate 4 of the electrical receptacle connector 100, where the protruding section 43 of the metallic plate 4 and the front ends of the contact portions 35 of the power terminals 33 are flushed with each other. In some embodiments, the end surface 43*a* of the protruding section 43 and the end surfaces 33*a* of the contact portions 35 of the power terminals 33 are flushed with each other at a horizontal plane (as shown in FIG. 8, the end surface 43*a* and the end surfaces 33*a* are arranged along a same imaginary horizontal plane). In this embodiment, a distance between the front end of the protruding section 43 and the front side surface 22*b* of the tongue portion 22 is the same as a distance between the front end of the contact portion 35 of the power terminal 33 and the front side surface 22*b* of the tongue portion 22.

Please refer to FIG. 5 to FIG. 7. In some embodiments, the contact portions 35 of the ground terminals 34 in the two rows correspond to the through portions 21, and the contact portions 35 of the ground terminals 34 in the two rows correspond to the holes of the through portions 421. Moreover, in some embodiments, the contact portions 35 of the ground terminals 34 in the two rows are not shielded by the metallic plate 4, and the contact portions 35 of the ground terminals 34 in the two rows face each other. Hence, in this embodiment, plastic materials can be conveniently filled through the holes of the through portions 421 to form the entire tongue portion 22, thereby increasing the molding efficiency.

Please refer to FIG. 5 to FIG. 7. In some embodiments, the through hole 42 of the metallic plate 4 is a hole formed by stamping techniques. The through hole 42 has a plurality of bent portions 44. As shown in FIG. 6, the bent portion 44 is approximately formed as a trapezoidal structure. Each of the bent portions 44 is between a corresponding one of the through portions 421 and the communication portion 422, and the bent portions 44 are bent toward the base portion 21.

Please refer to FIG. 6. In some embodiments, the metallic plate 4 has a plurality of recessed portions 45. The recessed portions 45 are at inner sides of the through hole 42 and correspond to the bent portions 44. An inner side of each of the recessed portions 451 has a slot 451. A width of the slot 4511 gradually increased from a middle portion of the slot 451 toward two ends of the slot 451. The two ends of each of the slots 451 are in communication with a corresponding one of the through portions 421 and the communication portion 422.

In some embodiments, taking the front side surface 22*b* of the tongue portion 22 as a reference surface, the front end of the contact portion 35 of each of the power terminals 33 and the ground terminals 34 in the two rows is nearer to the front side surface 22*b*, and the front end of the contact portion 35 of each of the high-speed signal terminals 31 and the low-speed signal terminals 32 in the two rows is farer from the front side surface 22*b* (as shown in FIG. 5). The front end of the contact portion 35 of each of the terminals 3 is covered by the tongue portion 22 (as shown in FIG. 3), and an upper surface or a lower surface of each of the contact portions 35 is exposed from the two faces 22*a* of the tongue portion 22.

Please refer to FIG. 2 and FIG. 3. In this embodiment, the terminals 3 at the upper row and a first insulated member 8 are formed with each other by insert-molding to form a first part, and the terminals 3 at the lower row and a second insulated member 9 are formed with each other by insert-molding, and then the metallic plate 4 is assembled on the second insulated member 9 to form a second part. Then, the first part and the second part are combined with each other, and the insulated housing 2 is combined with an assembly of the first part and the second part.

Please refer to FIG. 2 and FIG. 4. In some embodiments, the high-speed signal terminals 31 are divided into two groups respectively at two outermost sides of the low-speed signal terminals 32. The ground terminals 34 are at two outermost sides of the power terminals 33. The low-speed signal terminals 32 are between the power terminals 33. In at least one of the two rows at the two faces 22*a* of the tongue portion 22, each of the two groups of the high-speed signal terminals 31 is between an adjacent one of the power terminals 33 and an adjacent one of the ground terminals 34.

Please refer to FIG. 2 to FIG. 4. In some embodiments, the terminals 3 at one of the two faces 22*a* of the tongue portion 22 has four high-speed signal terminals 31 and two low-speed signal terminals 32, and the terminals 3 at the other face 22*a* of the tongue portion 22 has four high-speed signal terminals 31 and two low-speed signal terminals 32. Moreover, in some embodiments, the terminals 3 at one of the two faces 22*a* of the tongue portion 22 has two power terminals 33 and two ground terminals 34, and the terminals 3 at the other face 22*a* of the tongue portion 22 has two power terminals 33 and two ground terminals 34. In some embodiments, the area of the metallic plate 4 is extended in length and width to correspond to the entire tongue portion 22. Therefore, the metallic plate 4 can increase the structural strength of the tongue portion 22. The two sides of the metallic plate 4 protrude from two sides of the tongue portion 22 so as to be buckled by hooks of an electrical plug connector. Therefore, when an electrical plug connector is inserted into the electrical receptacle connector 100, owing to the two protruding sides of the metallic plate 4, the buckling pieces at the two sides of the electrical plug connector can be prevented from wearing against the two sides of the tongue portion 22 to cause the wearing and damaging of the tongue portion 22.

Please refer to FIG. 5 and FIG. 2. In some embodiments, each of the two sides of the metallic plate 4 has a connection portion 47, and the connection portions 47 are at the base portion 21. In this embodiment, the metallic plate 4 is connected to a material belt through the connection portions 47, and the connection portions 47 are not at the tongue portion 22.

Please refer to FIG. 2 and FIG. 3. In some embodiments, the metallic shell 1 is a multi-piece structure. The metallic shell 1 comprises an inner shell and a cover plate. The inner shell is a tubular structure and is fitted over the insulated housing 2. The cover plate is fitted over the inner shell, but embodiments are not limited thereto. In some embodiments, the metallic shell 1 may be a unitary element.

Please refer to FIG. 2 and FIG. 3. In some embodiments, the terminals 3 comprise body portions 36 and tail portions 37. The body portions 36 are held at the first insulated member 8 or the second insulated member 9. Each of the contact portions 35 extends from one of two ends of a corresponding one of the body portions 36 and at one or the other of the two faces 22*a* of the tongue portion 22. Each of the tail portions 37 extends from the other end of a corresponding one of the body portions 36 and protrudes from a rear portion of the first insulated member 8 or a rear portion of the second insulated member 9. The tail portions 37 are aligned horizontally to form flat legs (SMT (surface mount technology) legs which can be soldered or mounted on the surface of a circuit board using surface mount technology) and vertical legs (through-hole legs which can be soldered on the surface of a circuit board by through hole technology).

Please refer to FIG. 2 and FIG. 3. In some embodiments, the pin arrangement of the terminals 3 at the upper row of the tongue portion 22 shown in FIG. 2 is, from left to right, a ground terminal 34 (Gnd), a first pair of high-speed signal terminals 31 (TX1+−, differential signal terminals for high-speed signal transmission), a power terminals 33 (Power/VBUS), a function detection terminal (CC1, a terminal for inserting orientation detection of the connector and for cable recognition), a pair of low-speed signal terminals 32 (D+−, differential signal terminals for low-speed signal transmission), a reserved terminal (SBU1, which may be defined to provide other purposes), another power terminal 33 (Power/VBUS), a second pair of high-speed signal terminals 31 (RX2+−, differential signal terminals for high-speed signal transmission), and another ground terminal 34 (Gnd). In this embodiment, twelve terminals 3 are provided at the upper row of the tongue portion 22 for transmitting USB 3.0 signals.

Please refer to FIG. 2 and FIG. 3. In some embodiments, the pin arrangement of the terminals 3 at the lower row of the tongue portion 22 shown in FIG. 2 is, from right to left, a ground terminal 34 (Gnd), a first pair of high-speed signal terminals 31 (TX2+−, differential signal terminals for high-speed signal transmission), a power terminals 33 (Power/VBUS), a function detection terminal (CC2, a terminal for inserting orientation detection of the connector and for cable recognition), a pair of low-speed signal terminals 32 (D+−, differential signal terminals for low-speed signal transmission), a reserved terminal (SBU2, which may be defined to provide other purposes), another power terminal 33 (Power/VBUS), a second pair of high-speed signal terminals 31 (RX1+−, differential signal terminals for high-speed signal transmission), and another ground terminal 34 (Gnd). In this embodiment, twelve terminals 3 are provided at the lower row of the tongue portion 22 for transmitting USB 3.0 signals.

In some embodiments, the metallic plate 4 has several pins extending from two sides of the rear portion of the metallic plate 4 to form vertical legs (through-hole legs). In some embodiments, when signals are transmitted between the terminals of the electrical plug connector and the terminals 3 of the electrical receptacle connector 100, the terminals 3 of the electrical receptacle connector 100 can be isolated from each other by the metallic plate 4 to reduce the crosstalk signal interferences upon signal transmission. Moreover, the pins are provided for connecting to a circuit board for conduction and grounding. The metallic plate 4 is at the tongue portion 22 to increase the structural strength of the tongue portion 22.

Based on the above, according to one or some embodiments of the instant disclosure, the communication portion of the metallic plate is in communication with the through portions to form an elongated through hole. When the metallic plate and the insulated housing are molded by insert-molding, plastic materials can be conveniently filled through the hollow regions of the communication portion and the through portions to form the entire tongue portion, thereby increasing the molding efficiency as well as reducing the condition that front ends of the contact portions of the terminals are not properly covered by the tongue portion (the short shot condition of the plastic materials).

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An electrical receptacle connector, comprising:

a metallic shell comprising a receiving cavity;

an insulated housing in the receiving cavity, wherein the insulated housing comprises a base portion and a tongue portion extending outwardly from one side of the base portion; the tongue portion has two faces, a front side surface, and two side surfaces, the front side surface is connected to front side portions of the two faces, and the two side surfaces are connected to two sides of the two faces;

a plurality of terminals arranged in two rows and at the insulated housing, wherein the terminals comprise a plurality of contact portions, and the contact portions are at the two faces of the tongue portion; the terminals comprise a plurality of high-speed signal terminals, a plurality of low-speed signal terminals, a plurality of power terminals, and a plurality of ground terminals; the ground terminals are at two outermost sides of the power terminals, and the low-speed signal terminals are between the power terminals; in at least one of the two rows of the terminals; each of the high-speed signal terminals is between an adjacent one of the power terminals and an adjacent one of the ground terminals;

a metallic plate at the tongue portion and between the terminals in the two rows, wherein each of two sides of the metallic plate has a protrusion, and a side portion of each of the protrusions is exposed from a corresponding one of the two side surfaces of the tongue portion; the metallic plate has a through hole, and the through hole has a plurality of through portions and a communication portion; the through portions are at the protrusions and correspond to front ends of the contact portions of the high-speed signal terminals; each of two sides of the communication portion is in communication with a corresponding one of the through portions, and the communication portion corresponds to front ends of the contact portions of the low-speed signal terminals.

2. The electrical receptacle connector according to claim 1, wherein in the two rows of the terminals, the front ends of the contact portions of the high-speed signal terminals and the front ends of the contact portions of the low-speed signal terminals are shielded by the metallic plate.

3. The electrical receptacle connector according to claim 1, wherein the communication portion has an inner diameter, the metallic plate has a protruding section, and the protruding section extends toward the front side surface of the tongue portion to increase the inner diameter of the communication portion.

4. The electrical receptacle connector according to claim 3, wherein a distance between an end surface of the protruding section and the front side surface of the tongue portion is less than a distance between end surfaces of the contact portions of the power terminals and the front side surface of the tongue portion.

5. The electrical receptacle connector according to claim 3, wherein an end surface of the protruding section and end surfaces of the contact portions of the power terminals are flushed with each other at a horizontal plane.

6. The electrical receptacle connector according to claim 1, wherein the contact portions of the ground terminals in the two rows correspond to the through portions, and the contact portions of the power terminals in the two rows face each other.

7. The electrical receptacle connector according to claim 1, wherein the through hole has several bent portions between the through portions and the communication portion, and the bent portions are bent toward the base portion.

8. The electrical receptacle connector according to claim 7, wherein the metallic plate has a plurality of recessed portions; the recessed portions are at inner sides of the through hole and correspond to the bent portions; an inner side of each of the recessed portions has a slot, and a width of the slot gradually increases from a middle portion of the slot toward two ends of the slot; the two ends of each of the slots are in communication with a corresponding one of the through portions and the communication portion.

9. The electrical receptacle connector according to claim 1, wherein a front end of each of the protrusions is exposed from the front side surface of the tongue portion.

10. The electrical receptacle connector according to claim 1, wherein each of the two sides of the metallic plate has a connection portion, and the connection portions are at the base portion.

11. An electrical receptacle connector, comprising:

a metallic shell comprising a receiving cavity;

an insulated housing in the receiving cavity, wherein the insulated housing comprises a base portion and a tongue portion extending outwardly from one side of the base portion; the tongue portion has two faces, a front side surface, and two side surfaces, the front side surface is connected to front side portions of the two faces, and the two side surfaces are connected to two sides of the two faces;

a plurality of terminals arranged in two rows and at the insulated housing; and a metallic plate at the tongue portion and between the terminals in the two rows, wherein the metallic plate has a large cutout at a front edge thereof, each of two sides of the metallic plate has a protrusion, and a side portion of each of the protrusions is exposed from a corresponding one of the two side surfaces of the tongue portion; the metallic plate has a through hole, and the through hole has a plurality of through portions and a communication portion; the through portions are at the protrusions, and each of the through portions is between the large cutout and a corresponding side of the metallic plate; each of two sides of the communication portion is in communication with a corresponding one of the through portions.

12. The electrical receptacle connector according to claim 11, wherein the terminals comprise a plurality of contact portions, and the contact portions are at the two faces of the tongue portion; the terminals comprise a plurality of high-speed signal terminals, a plurality of low-speed signal terminals, a plurality of power terminals, and a plurality of ground terminals; the ground terminals are at two outermost sides of the power terminals, and the low-speed signal terminals are between the power terminals; in at least one of the two rows of the terminals, each of the high-speed signal terminals is between an adjacent one of the power terminals and an adjacent one of the ground terminals.

13. The electrical receptacle connector according to claim 12, wherein in the two rows of the terminals, the front ends of the contact portions of the high-speed signal terminals and the front ends of the contact portions of the low-speed signal terminals are shielded by the metallic plate, the through portions correspond to the front ends of the contact portions of the high-speed signal terminals, and the communication portion corresponds to the front ends of the contact portions of the low-speed signal terminals.

14. The electrical receptacle connector according to claim 11, wherein the communication portion has an inner diameter, the metallic plate has a protruding section, and the protruding section extends toward the front side surface of the tongue portion to increase the inner diameter of the communication portion.

15. The electrical receptacle connector according to claim 13, wherein a distance between an end surface of the protruding section and the front side surface of the tongue portion is less than a distance between end surfaces of the contact portions of the power terminals and the front side surface of the tongue portion.

16. The electrical receptacle connector according to claim 13, wherein an end surface of the protruding section and end surfaces of the contact portions of the power terminals are flushed with each other at a horizontal plane.

17. The electrical receptacle connector according to claim 13, wherein the contact portions of the ground terminals in the two rows correspond to the through portions, and the contact portions of the power terminals in the two rows face each other.

18. The electrical receptacle connector according to claim 11, wherein the through hole has several bent portions between the through portions and the communication portion, and the bent portions are bent toward the base portion.

19. The electrical receptacle connector according to claim 17, wherein the metallic plate has a plurality of recessed portions; the recessed portions are at inner sides of the through hole and correspond to the bent portions; an inner side of each of the recessed portions has a slot, and a width of the slot gradually increases from a middle portion of the slot toward two ends of the slot; the two ends of each of the slots are in communication with a corresponding one of the through portions and the communication portion.

20. The electrical receptacle connector according to claim 11, wherein a front end of each of the protrusions is exposed from the front side surface of the tongue portion.

* * * * *